United States Patent [19]

Takemoto et al.

[11] Patent Number: 5,482,266
[45] Date of Patent: Jan. 9, 1996

[54] PAPER CONVEYING APPARATUS HAVING A BELT TENSION ADJUSTING MECHANISM

[75] Inventors: Takatoshi Takemoto, Tokyo; Noriaki Kano, Hanamaki; Yoshide Kurihara, Hanamaki; Kousiro Nakai, Hanamaki; Eizi Ito, Hanamaki, all of Japan

[73] Assignee: Kabushiki Kaisha Ace Denken, Japan

[21] Appl. No.: 306,138

[22] Filed: Sep. 14, 1994

[30] Foreign Application Priority Data

Apr. 3, 1991 [JP] Japan ........................................ 3-71014

[51] Int. Cl.$^6$ .................................................... B65H 5/00
[52] U.S. Cl. ........................ 271/272; 271/275; 271/198; 198/813; 474/113; 474/136
[58] Field of Search ..................................... 271/272, 275, 271/198; 198/813; 474/113, 136, 101

[56] References Cited

U.S. PATENT DOCUMENTS

| 119,536 | 10/1871 | Schmidt | 474/136 |
|---|---|---|---|
| 1,170,611 | 2/1916 | Coulbourn | 198/813 |

FOREIGN PATENT DOCUMENTS

| 0069109 | 1/1983 | European Pat. Off. | 474/113 |
|---|---|---|---|
| 62-47550 | 3/1987 | Japan . | |
| 0212643 | 9/1988 | Japan | 271/272 |
| 2235676 | 3/1991 | Japan | 271/272 |

*Primary Examiner*—H. Grant Skaggs
*Attorney, Agent, or Firm*—Andrus, Sceales, Starke & Sawall

[57] ABSTRACT

A belt tension adjusting mechanism comprises a belt tension adjusting pulley over which the endless belt is placed; a plate having a plurality of recesses in which a rotary shaft of the belt tension adjusting pulley is received; a handle having, at one end thereof, a pin engageable with the recess; and a linking member connected, at one end thereof, with the rotary shaft of the belt tension adjusting pulley and connected, at the other end thereof, with an intermediate portion of the handle.

7 Claims, 5 Drawing Sheets

PAPER CONVEYING APPARATUS HAVING A BELT TENSION ADJUSTING MECHANISM

BACKGROUND OF THE INVENTION

1. Field of the Invention

This invention relates to a paper conveying apparatus, and more particularly to a paper conveying apparatus having a belt tension adjusting mechanism.

2. Description of the Related Art

A conventional paper conveying apparatus comprises a drive pulley and a driven pulley which are provided to have a specified distance apart, an endless belt placed over the drive and driven pulleys, and a plurality of pairs of pinch pulleys spaced along the endless belt. In the conventional paper conveying apparatus, the endless belt is circulated with the rotation of the drive pulley, the paper is sandwiched between the pinch pulley and the endless belt and conveyed along the circulation of the endless belt. The endless belt, as being used in such an apparatus, will be stretched and gradually become loose. If the loosened endless belt is continued to be used, the conveyed papers will become jammed as a result of the conveying speed becoming uneven. The loosened endless belt further causes problems such as abrasion of itself or making grains or powders, as a result of rubbing against surrounding parts. To prevent such problems, a tension adjusting pulley is provided in the circulating path of the endless belt and, further the position of a rotary shaft of the tension adjusting pulley is changed with separate tools so as to tighten the endless belt.

However in the conventional art, because tools are used to change the position of the tension adjusting pulley, it takes time to adjust the tension of the endless belt each time the endless belt becomes loose.

SUMMARY OF THE INVENTION

The present invention has as its object to provide a paper conveying apparatus in which the tension of an endless belt can be adjusted easily without using separate tools.

In order to accomplish the object, a paper conveying apparatus for conveying a paper comprises;

an endless belt to be in contact with one main face of the paper to be conveyed;

a bias member to be in contact with the other main face of the paper for biasing the paper being conveyed toward the endless belt;

drive and driven pulleys, over which the endless belt is placed;

a pulley rotating mechanism for rotating the drive pulley; and a belt tension adjusting mechanism for adjusting the tension of the endless belt;

the belt tension adjusting mechanism including;

a belt tension adjusting pulley having a rotary shaft over which the endless belt is further placed;

a support member extending from an imaginary or hypothetical segment connecting the drive pulley and the driven pulley, and having at least three recesses arranged in the extending direction of said support member, for receiving the rotary shaft of the belt tension adjusting pulley therein;

a handle formed in a bar having, at one end thereof, a pin which is engageable with any one of the recesses and, at the other end thereof, a grip; and a linking member formed in a bar and having one end which is connected to the rotary shaft of the belt tension adjusting pulley, allowing relative rotation thereto and having another end which is connected to the handle at its intermediate position between the pin and the grip, allowing relative rotation between the linking member and the handle.

To explain the operation of the mentioned paper conveying apparatus, it will be assumed that the shaft of the belt tension adjusting pulley is placed in the nearest recess (hereinafter referred to as the first recess) to the imaginary segment as specified above, and the pin of the handle is placed in the second nearest recess to the imaginary segment (hereinafter referred to as the second recess), when the endless belt becomes loose.

An operator grips the grip of the handle, removes the pin of the handle from the second recess, and puts it into the third nearest recess to the imaginary segment (hereinafter referred to as the third recess). Then, the operator moves the handle, using the pin just inserted into the third recess as a fulcrum, so as to move the linking member connected with the intermediate of the handle, away from the imaginary segment. As a result of this operation, the rotary shaft of the belt tension adjusting pulley provided at the end of the linking member is removed from the first recess. Then, the operator moves the linking member further away from the imaginary segment, and the shaft of the belt tension adjusting pulley is inserted into the second recess. As a result of the operation, by moving the belt tension adjusting pulley, a path of the endless belt becomes longer and the looseness of the belt is removed.

In the paper conveying apparatus according to the present invention, the tension of the endless belt is adjusted easily by operation of the handle without separate tools.

In the paper conveying apparatus, it is preferable that the belt tension adjusting pulley is provided at a position just before the driven pulley in the conveying direction of the endless belt.

Further, it is preferable that the belt tension adjusting mechanism has an auxiliary pulley which pulls the endless belt, stretched by the tension adjusting pulley away from the imaginary segment connecting the drive pulley and the driven pulley, back to the imaginary segment.

BRIEF DESCRIPTION OF THE DRAWINGS

FIG. 6A shows the belt path when the auxiliary pulley is provided, and FIG. 6B shows the belt path when no auxiliary pulley is provided.

DETAILED DESCRIPTION OF THE PREFERRED EMBODIMENT

An embodiment according to the present invention will be described with reference to the drawings.

Figure 7:
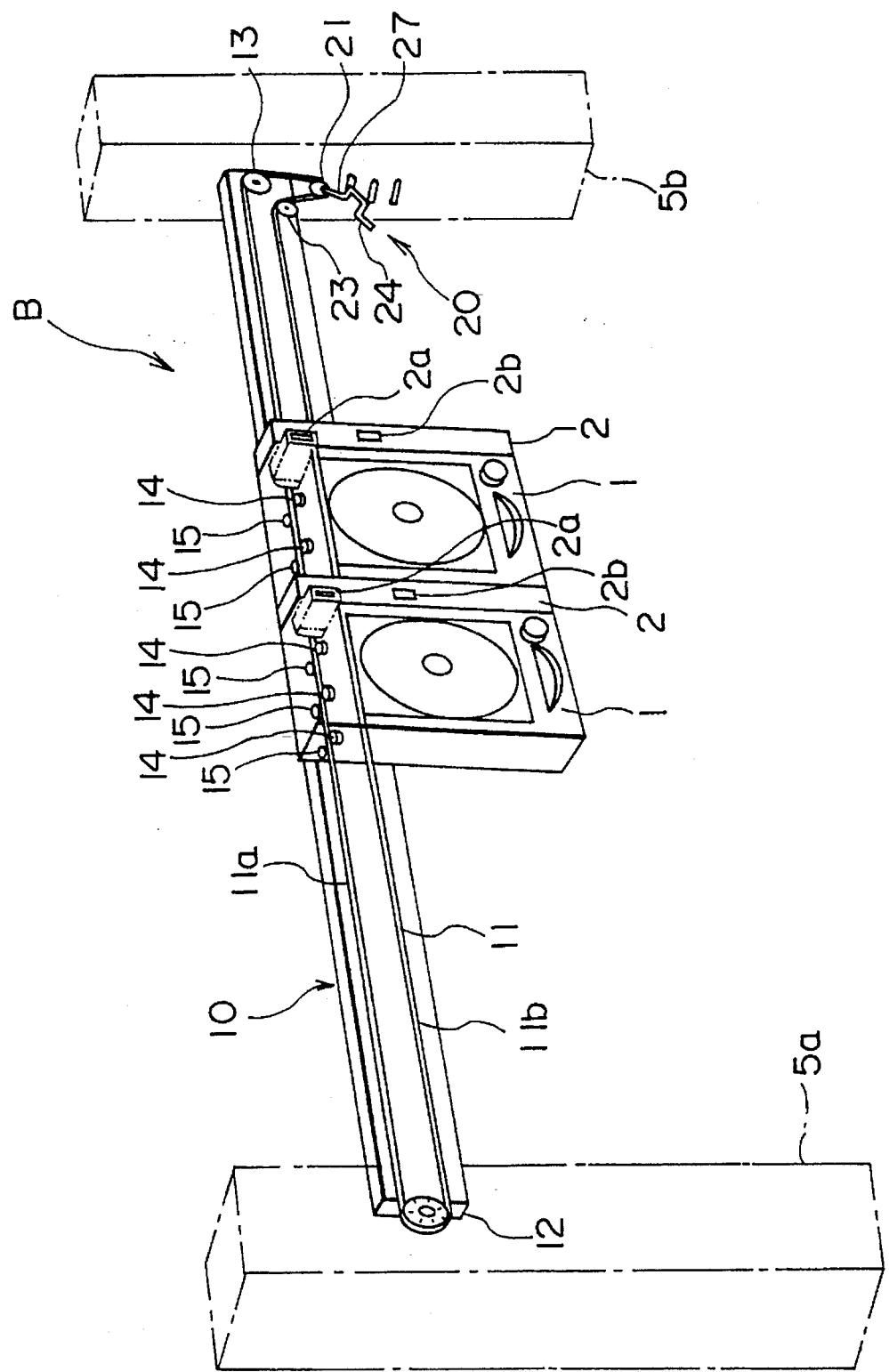
FIG. 7 is a perspective view of the pachinko island of the embodiment according to the present invention.

As shown in FIG. 7, a pachinko island B is comprised of a plurality of pachinko machines 1, on which a player plays a pachinko game using a plurality of pachinko balls, a number of ball lending machines 2 for dispensing an amount of pachinko balls in accordance with an amount of inserted bank notes, island decorations 5a, 5b each having an exchanging machine etc., and a bank note conveying apparatus 10 for leading bank notes from the ball lending machines 2 to the exchange machine in the island decoration 5a. The pachinko machines 1 and the ball lending machines 2 are arranged alternately in line so as to form a row of pachinko machines. To form a pachinko island B, two rows of the pachinko machines are disposed back to back in parallel with each other, with a space maintained between them. In FIG. 7, only one row of pachinko machines is shown. At both ends of the pachinko island, the island decorations 5a and 5b are provided. The bank note conveying apparatus 10 is provided in the space between the two rows of pachinko machines, extending from one island decoration 5a to the other island decoration 5b.

The bank note conveying apparatus 10 comprises a drive pulley 12, a driven pulley 13, an endless belt 11 which is positioned over the drive and driven pulleys, a pulley rotating mechanism (not shown) for rotating the drive pulley 12, a pinch pulley 14 (bias member) and a support pulley 15 provided at positions opposite to each other regarding the endless belt 11 as a center line, and a belt tension adjusting mechanism 20. Plates 30 and 35 (shown in FIG. 1) are provided perpendicular to the floor F between the island decorations 5a, 5b and the row of pachinko machines, respectively.

Figure 1:
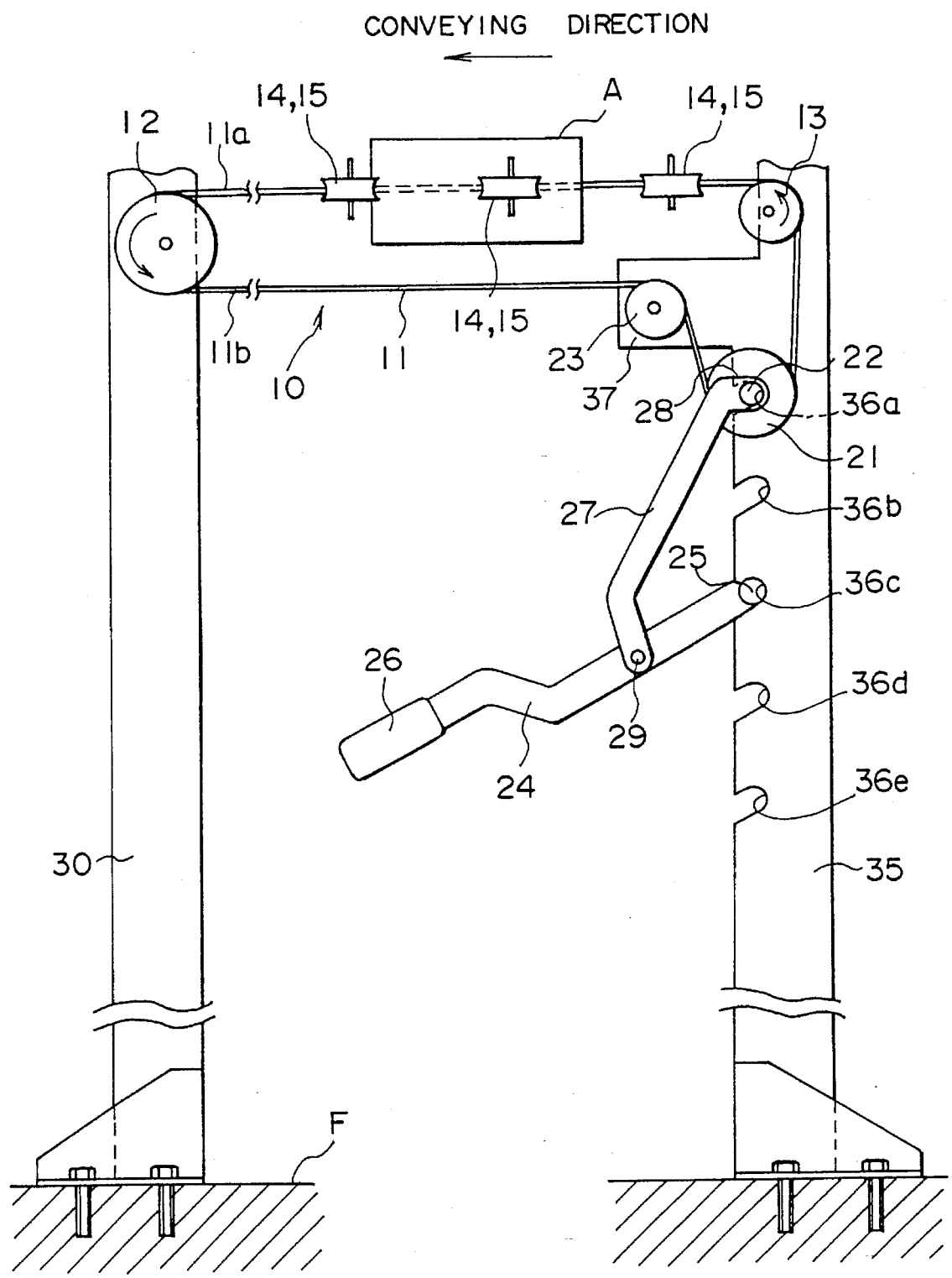
FIG. 1 is a front view of a paper conveying apparatus according to an embodiment of the present invention.

As shown in FIG. 1, at predetermined heights of the plates 30 and 35, the drive pulley 12 and the driven pulley 13 are rotatably installed, respectively. The endless belt 11 is placed over the drive and driven pulleys 12 and 13, so as to be extended almost horizontally along the row of pachinko machines. The drive pulley 12 is driven by the pulley rotating mechanism so that an upper part of the endless belt 11a (hereinafter, referred to as the "tension side") between the pulleys 12 and 13 moves toward the drive pulley side. A bank note A is conveyed in contact with the tension side 11a of the endless belt 11. Therefore, the bank note conveying direction in the present embodiment is from the driven pulley side to the drive pulley side in the horizontal direction.

A plurality of pinch pulleys 14 are provided rotatably along the tension side 11a of the endless belt 11 in a horizontal direction and having a determined space between each of the adjoining pulleys. The space between the adjoining pinch pulleys is set shorter than the length of the conveyed bank note. As mentioned above, the support pulleys 15 are provided opposite to the pinch pulleys 14 symmetrically around the endless belt 11. In FIG. 1, the support pulleys 15 are hidden behind the pinch pulleys 14. The pinch pulleys 14 and the support pulleys 15 are installed in a conveying path forming assembly (not shown), for regulating the position of bank note at least in the width direction (the vertical direction of the bank note drawn in FIG. 1).

The belt tension adjusting mechanism 20 has a tension adjusting pulley 21 provided below the driven pulley 13, an auxiliary pulley 23 provided between the driven pulley 13 and the tension pulley 21 in a vertical direction and slightly towards the drive pulley side in a horizontal direction, a handle 24 for changing the position of the tension adjusting pulley 21 and a linking member 27 for linking the handle 24 and a rotary shaft 22 of the tension adjusting pulley 21.

On the drive pulley side of the plate (support member) 35 on which the driven pulley 13 is installed, a plurality of recesses 36a, 36b . . . for placing the rotary shaft 22 or a pin 25 of the handle 24 are formed and arranged below the driven pulley 13, in line and having equal intervals between each other. Each recess is formed to be slanted upwardly from the face of the drive pulley side of the plate 35. The rotary shaft 22 of the tension adjusting pulley 21 can be placed rotatably in one of the plurality of recesses.

On the drive pulley side of the plate 35 installing the driven pulley 13 thereon, a projected portion 37 is formed slightly below the driven pulley 13. On the projected portion 37, the auxiliary pulley 23 is rotatably installed. The endless belt 11 is placed over the tension adjusting pulley 21 and the auxiliary pulley 23 as well as the drive pulley 12 and the driven pulley 13. It is important that the tension side 11a of the endless belt which moves from the driven pulley 13 to the drive pulley 12 is not placed over the tension adjusting pulley 21 and the auxiliary pulley 23, but by the loose side of the endless belt 11b, which moves from the drive pulley 12 to the driven pulley 13. The positioning of the tension adjusting pulley 21 and the auxiliary puller 23 is determined by considering that the tension side 11a conveys banknote A and that the tension force of the loose side 11b is slightly smaller than that of the tension side 11a so that it is more easily adjusted. The auxiliary pulley 23 has the role of pulling up the endless belt 11 which is pulled down by the tension adjusting pulley 21.

The handle 24 is formed in a bar. The pin 25 is provided at one end of the bar, which can be put into one of the recesses 36a 36b . . . on the plate 35. At the other end of the handle 24, a grip 26 is provided for an operation by an operator. The linking member 27 is also formed in a bar. One end 28 of the linking member 27 is attached to the rotary shaft 22 of the tension adjusting pulley 21 and the other end is attached to the middle of the handle 24 via a pin 29. The linking member 27 is pivotally connected with respect to the shaft 22 of the tension pulley 21. Likewise, the linking member 27 is pivotally attached with respect to the middle of the handle 24 via the pin 29. Both the handle 24 and the linking member 27 curve slightly so as to avoid interfering with other members and to assure good operability. Concretely, the handle 24 is cranked, and both ends of the linking member 27 are bent slantly.

The operation of the pachinko island according to the present embodiment will now be described.

When a player feels that pachinko balls required for playing are running short, the player inserts a bank note A into a bank note insertion slot 2a of a ball lending machine 2. When the ball lending machine 2 receives the bank note A, the ball lending machine 2 determines whether the bank note is genuine or not, etc. When the ball lending machine 2 determines that the bank note A is genuine, the ball lending machine leads the bank note A to the bank note conveying device 10, and discharges an amount of pachinko balls in accordance with an amount of the bank note A, to a ball discharging slot 2b.

The bank note A from the ball lending machine 2 is transferred between the endless belt 11 and the pinch pulleys (bias members) 14 of the bank note conveying device. That is, one face of the bank note is in contact with the endless belt and the other face of the bank note is in contact with the pinch pulley 14. The bank note A is conveyed to an exchange machine in the island decoration 5a of the drive pulley side along the circulation of the endless belt 11 while being sandwiched between the endless belt and the pinch pulleys 14.

When the endless belt 11 becomes loose due to a change of the belt with time, the loosened endless belt 11 causes the aforementioned inconvenience. In the present embodiment, the tension of the endless belt 11 is adjusted by operating the handle 24 of the belt tension adjusting mechanism 20.

The steps of the belt tension adjustment of the endless belt 11 will be described concretely.

It is now assumed that at the time the endless belt 11 becomes loose, the rotary shaft 22 of the belt tension pulley 21 is placed in the top recess 36a and the pin 25 of the handle 24 is placed in the third recess 36c from tile top, as shown in FIG. 1. In this position, since the rotary shaft 22 in the top recess 36a is pulled up by the endless belt 11 being positioned over the belt tension pulley 21, it does not come out from the recess unless a stronger force, directed downwards, acts on the shaft 22. Accordingly, the following description explains how the stronger force directed downwards acts on the shaft 22 as a result of operating the handle 24.

Figure 2:
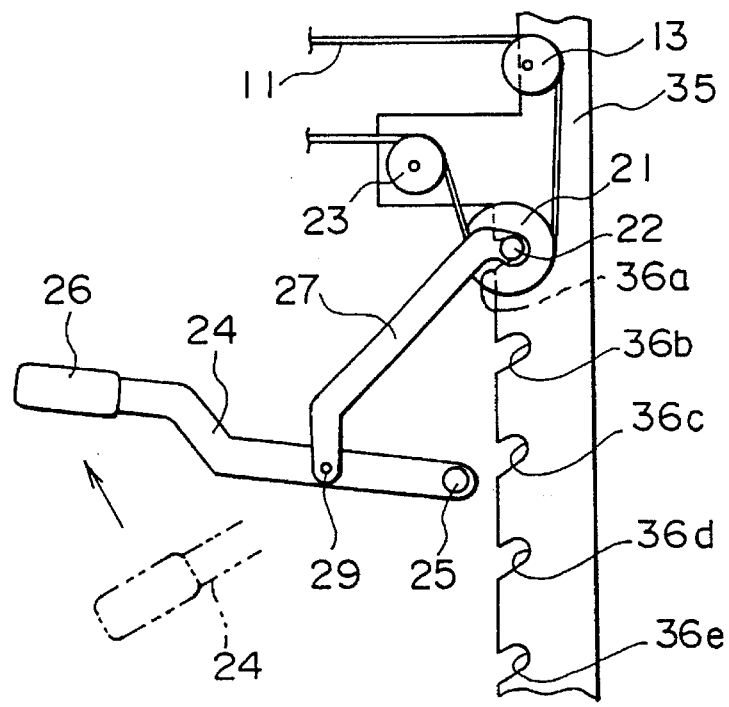
FIGS. 2 to 5 are front views of a belt tension adjusting mechanism of the embodiment of the present invention, showing it in variations positions during the belt tension adjusting operation.
Figure 3:
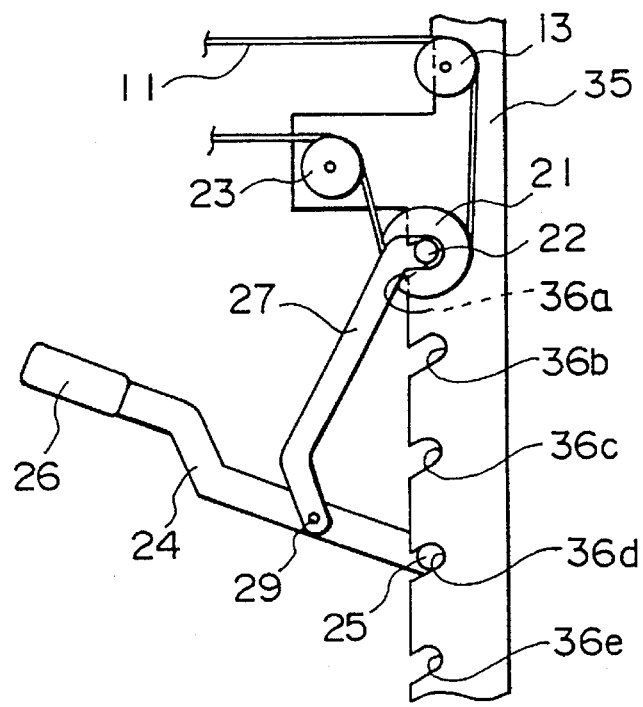

As shown in FIG. 2, an operator raises the grip 26 of the handle 24 up so as to move the pin 25 of the handle 24 out of the recess 36c. Then, as shown in FIG. 3, the operator moves the grip 26 slightly up and toward the plate 35 so as to insert the pin 25 into the forth recess 36d.

Figure 4:
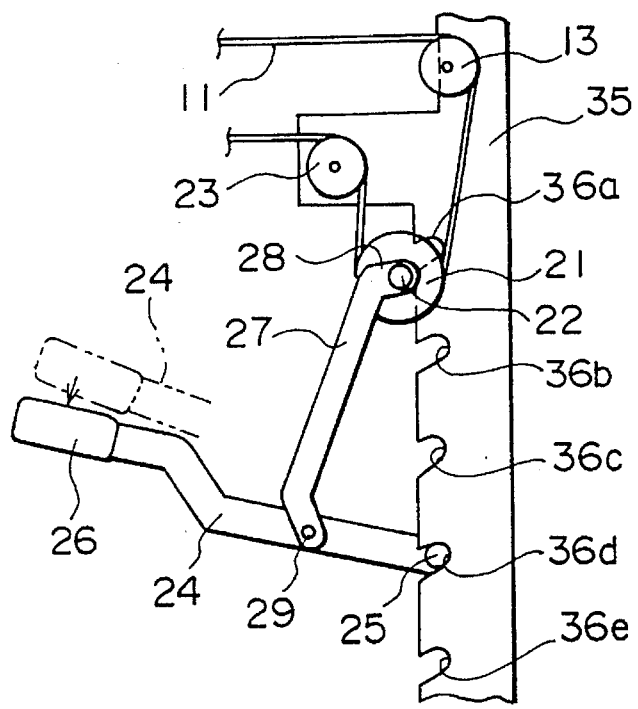
Figure 5:
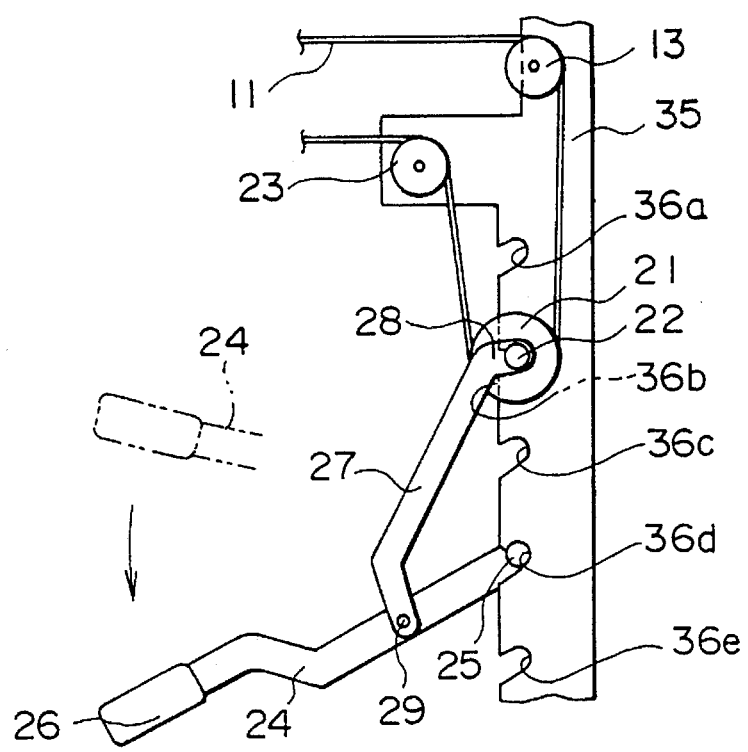

Then, as shown in FIG. 4, the operator moves the grip 26 down, using the pin 25 being inserted into the recess 36c as a fulcrum. As a result of this operation, the linking member 27 attached at the middle of the handle 24 is pulled down and the rotary shaft 22 of the tension adjusting pulley 21 attached at the end 28 of the linking member 27 is removed from the recess 36a. Then, as shown in FIG. 5, the operator further moves the grip down, still using the pin 25 of the handle 24 as a fulcrum, so as to lower the linking member 27 and to insert the rotary shaft 22 into the second recess 36b.

By operating the handle 24 so as to move both the handle 24 and the linking member 27 down, in an action resembling the movement of an inchworm, the rotary shaft 22 of the tension adjusting pulley 21 can be moved down from the top recess 36a to the second recess 36b. After the movement, the tension adjusting pulley 21 moves away from the driven pulley 13 and the loose endless belt 11 is tightened and tensioned. When the endless belt 11 becomes loose again, the handle 24 is operated to move the tension adjusting pulley 21 down again.

Figure 6A:
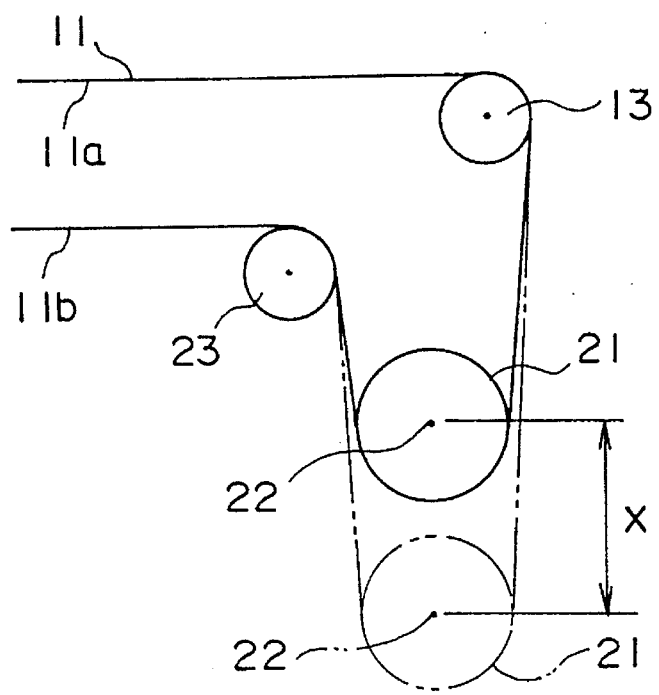
FIGS. 6A and 6B are explanatory views for explaining the advantage of having an auxiliary pulley.
Figure 6B:
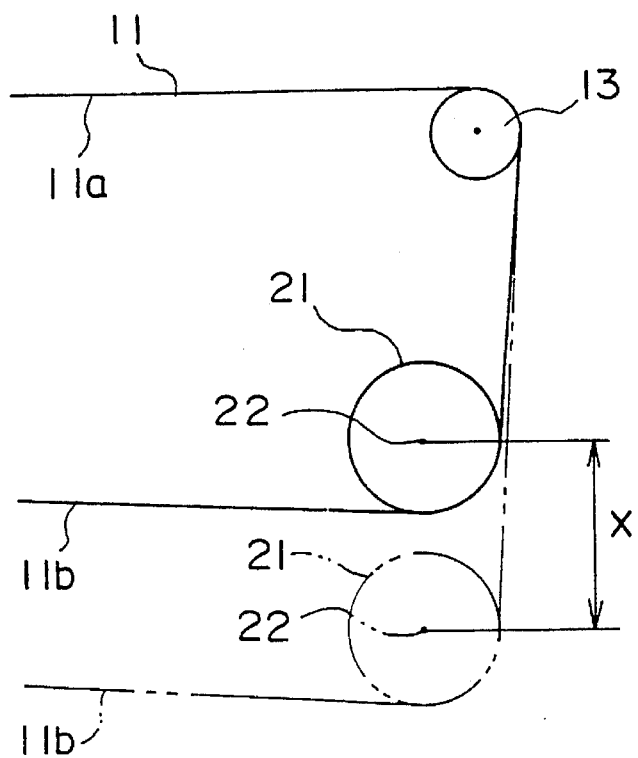

By the way, the auxiliary pulley 23 for correcting the path of the endless belt 11 may be omitted. As shown in FIG. 6B, if the auxiliary pulley 23 is not used, the regulation of the tension of the endless belt 11 is still possible by lowering the tension adjusting pulley 21 to make the path of the endless belt longer. In this case, the path length become about a distance X longer when the tension adjusting pulley 21 is lowered by a distance X. On the contrary, as shown in FIG. 6A, in a case that the auxiliary pulley 23 is used so as to pull up the endless belt 11 which is pulled down by the tension adjusting pulley 21, the path length becomes about a distance 2X longer as can be seen in FIG. 6A. When the auxiliary pulley 23 is used, the path length of the endless belt 11 can effectively be lengthened only by moving the tension adjusting pulley 21 slightly. Further, the auxiliary pulley 23 contributes to reduction on size of the bank note conveying apparatus 10 because the loose side belt runs near to the tension side belt.

Although the belt tension adjusting mechanism 20 is provided on the side of the driven pulley 13 in the present embodiment, the position is not limited to such, and it may be on the side of the drive pulley or in an intermediate position between the drive and driven pulleys 12 and 13. In a case where the belt tension adjusting mechanism is provided the intermediate position between the drive and driven pulleys 12 13, it is preferable that two auxiliary pulleys are provided at both sides of the tension adjusting pulley 21.

What is claimed is:

1. A paper conveying apparatus for conveying paper comprising;

an endless belt to be in contact with one main face of the paper to be conveyed;

a bias member to be in contact with the other main face of the paper for biasing the paper being conveyed toward said endless belt;

drive and driven pulleys, over which said endless belt is placed;

a pulley rotating mechanism for rotating said drive pulley; and a belt tension adjusting mechanism for adjusting the tension of said endless belt;

said belt tension adjusting mechanism including;

a belt tension adjusting pulley having a rotary shaft over which said endless belt is further placed;

a support member extending from an imaginary segment connecting said drive pulley and said driven pulley, and having at least three recesses arranged in an extending direction of said support member, for receiving said rotary shaft of said belt tension adjusting pulley therein;

a handle formed as a bar having, at one end thereof, a pin which is engageable with any one of said recesses and, at the other end thereof, a grip; and a linking member formed as a bar and having one end which is connected to said rotary shaft of said belt tension adjusting pulley, allowing relative rotation thereto and having another end which is connected to said handle at an intermediate position between the pin and the grip, allowing relative rotation between the linking member and the handle.

2. A paper conveying apparatus according to claim 1, wherein, said belt tension adjusting pulley is positioned at a loosened side of said endless belt, where the belt moves from said drive pulley toward said driven pulley.

3. A paper conveying apparatus according to claim 2, wherein, said belt tension adjusting mechanism comprises an auxiliary pulley which pulls said endless belt, stretched by said belt tension adjusting pulley away from the imaginary segment connecting said drive pulley and said driven pulley, back towards the imaginary segment.

4. A paper conveying apparatus according to claim 2, wherein, said support member rotatably supports said driven pulley and extends from the position where said driven pulley is supported, in a direction perpendicular to the imaginary segment connecting said drive pulley and said driven pulley.

5. A paper conveying apparatus according to claim 1, wherein, said belt tension adjusting mechanism comprises an auxiliary pulley which pulls said endless belt, stretched by said belt tension adjusting pulley away from the imaginary segment connecting said drive pulley and said driven pulley, back toward the imaginary segment.

6. A paper conveying apparatus according to claim 5, wherein, said support member rotatably supports said driven pulley and extends from the position where said driven pulley is supported, in a direction perpendicular to the imaginary segment connecting said drive pulley and said driven pulley.

7. A paper conveying apparatus according to claim 1, wherein, said support member rotatably supports said driven pulley and extends from the position where said driven pulley is supported, in a direction perpendicular to the imaginary segment connecting said drive pulley and said driven pulley.

\* \* \* \* \*